United States Patent [19]

Boxey et al.

[11] Patent Number: 5,692,772
[45] Date of Patent: Dec. 2, 1997

[54] RETAINER FOR AN INFLATABLE VEHICLE OCCUPANT PROTECTION DEVICE

[75] Inventors: Kevin J. Boxey, Columbiaville; Andrew J. Smydra, Rochester, both of Mich.

[73] Assignee: TRW Vehicle Safety Systems Inc., Lyndhurst, Ohio

[21] Appl. No.: 630,718

[22] Filed: Apr. 8, 1996

[51] Int. Cl.$^6$ ............................................. B60R 21/16
[52] U.S. Cl. ........................................ 280/728.2; 280/732
[58] Field of Search ............................. 280/728.2, 731, 280/732

[56] References Cited

U.S. PATENT DOCUMENTS

| | | | |
|---|---|---|---|
| 4,815,866 | 3/1989 | Martone | 383/34.1 |
| 4,817,828 | 4/1989 | Goetz | 222/3 |
| 4,842,300 | 6/1989 | Ziomek et al. | 280/732 |
| 4,941,678 | 7/1990 | Lauritzen et al. | 280/732 |
| 5,074,585 | 12/1991 | Satoh | 280/743.1 |
| 5,255,937 | 10/1993 | EmamBakhsh et al. | 280/728.2 |
| 5,356,174 | 10/1994 | Rhein et al. | 280/728.2 |
| 5,470,098 | 11/1995 | Szigethy et al. | 280/728.2 |
| 5,560,644 | 10/1996 | Fiore | 280/728.2 |
| 5,607,179 | 3/1997 | Lenart et al. | 280/728.2 |

FOREIGN PATENT DOCUMENTS 2125935 12/1994 Canada.

*Primary Examiner*—Kenneth R. Rice
*Attorney, Agent, or Firm*—Tarolli, Sundheim, Covell, Tummino & Szabo

[57] ABSTRACT

A vehicle occupant protection apparatus (10) comprises an inflatable vehicle occupant protection device, such as an air bag (12), a reaction canister (20), and a rectangular retainer frame (74). The reaction canister (20) has four walls (50, 52, 54, 56) in a rectangular configuration surrounding an inlet portion (72) of the air bag (12). The retainer frame (74) is enclosed within the inlet portion (72) of the air bag (12). The length and width of the retainer frame (74) are defined by first, second, third, and fourth retainer strips (100, 102, 104, 106) which are separate parts. Fasteners (76) press each of the retainer strips (100–106) against a corresponding one of the four walls (50–56) so as to clamp the inlet portion (72) of the air bag (12) between the retainer frame (74) and the reaction canister (20). The first and second strips (100, 102) support the third and fourth strips (104, 106) for limited movement along the length and across the width of the retainer frame (74) under the influence of the fasteners (76) when the fasteners (76) are pressing the strips (100–106) against the walls (50–56).

12 Claims, 5 Drawing Sheets

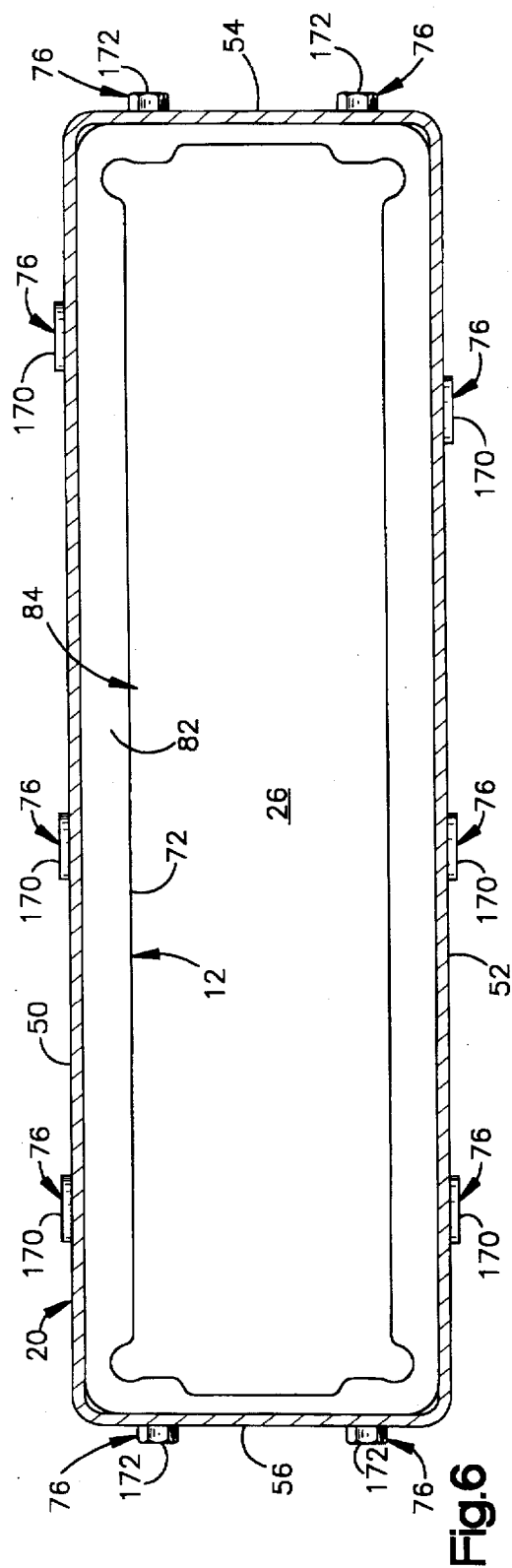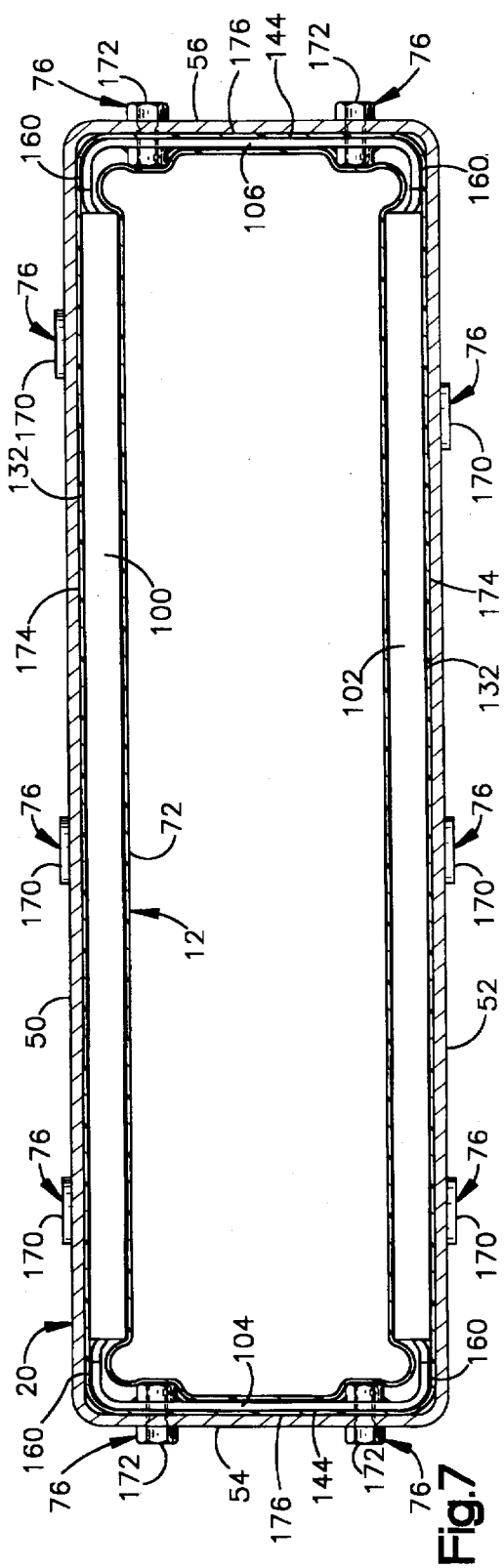

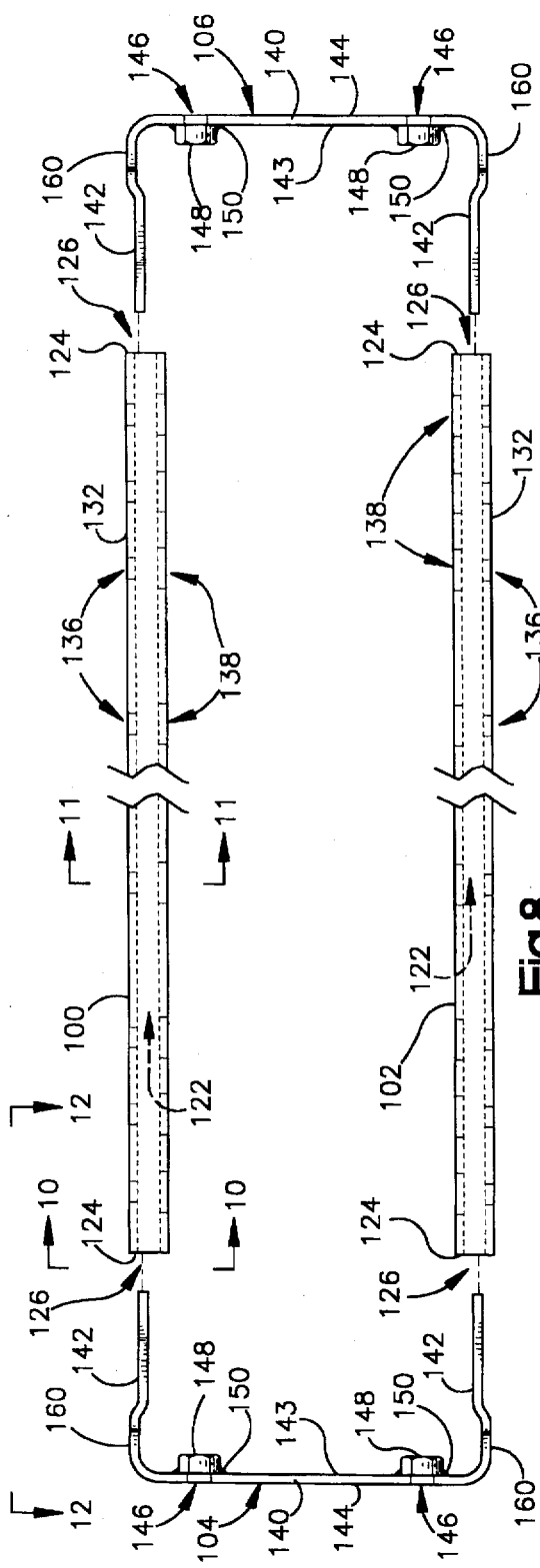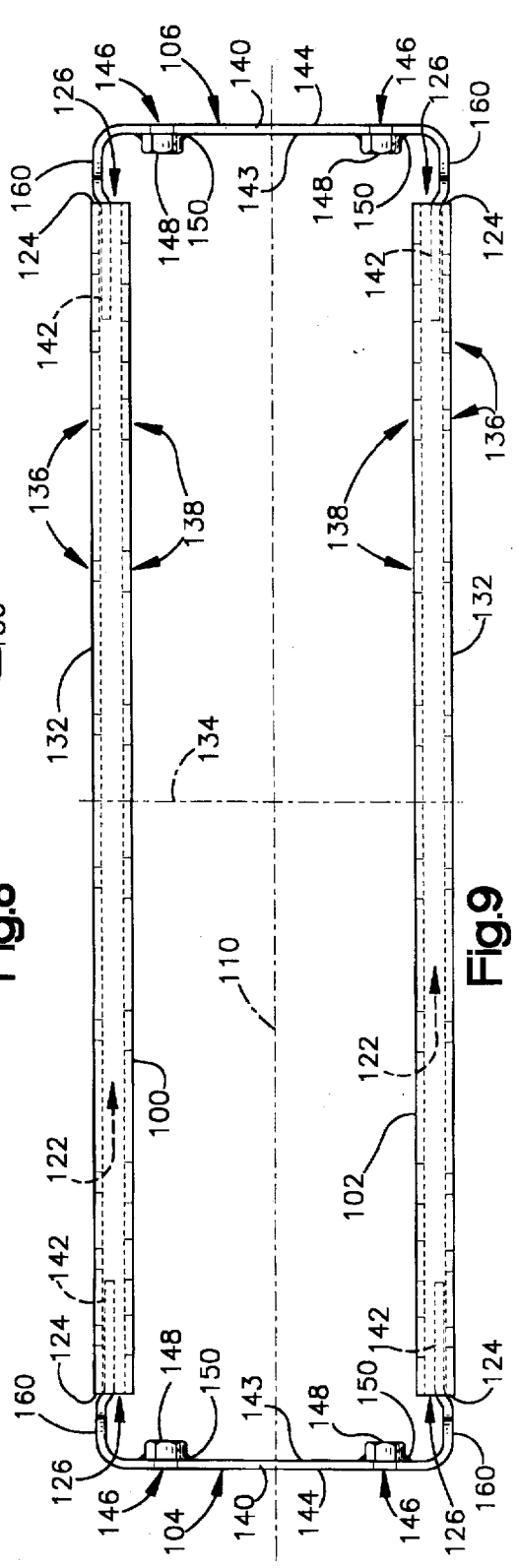

RETAINER FOR AN INFLATABLE VEHICLE OCCUPANT PROTECTION DEVICE

FIELD OF THE INVENTION

The present invention relates to an inflatable vehicle occupant protection device, and particularly relates to a retainer for retaining the protection device in a reaction structure.

BACKGROUND OF THE INVENTION

An inflatable vehicle occupant protection device, such as an air bag, is part of an apparatus which further includes a collision sensor and an inflator. When the collision sensor senses a vehicle collision having at least a predetermined threshold level of severity, the inflator is actuated. The inflator then emits inflation fluid which inflates the air bag into the vehicle occupant compartment to help protect an occupant of the vehicle.

An air bag and an inflator are typically assembled together as parts of an air bag module which is separate from the collision sensor. The air bag module is located in the vehicle adjacent to the vehicle occupant compartment. For example, a driver's side air bag module is typically located on the vehicle steering column. A passenger side air bag module is typically located in the vehicle instrument panel. In addition to the air bag and the inflator, a passenger side air bag module may include a reaction canister and a deployment door. The reaction canister contains the air bag and the inflator. The deployment door extends across the air bag to conceal the air bag and the other parts of the module from the vehicle occupant compartment.

When the inflation fluid is emitted from the inflator, it flows into the air bag through an inlet portion of the air bag. The inflation fluid then moves a major portion of the air bag forcefully outward against the deployment door. The deployment door is ruptured by the force of the fluid pressure in the air bag, and is moved pivotally open as the inflation fluid continues to move the major portion of the air bag outward into the vehicle occupant compartment. The inlet portion of the air bag is retained in the reaction canister by a retainer which is fixed to the reaction canister.

SUMMARY OF THE INVENTION

In accordance with the present invention, an apparatus comprises an inflatable vehicle occupant protection device, a reaction structure, and a rectangular retainer frame. The reaction structure has four walls in a rectangular configuration surrounding an inlet portion of the protection device. The retainer frame is enclosed within the inlet portion of the protection device, and has a length and width defined by first, second, third, and fourth retainer strips which are separate parts.

The apparatus further comprises fastener means for pressing each of the retainer strips against a corresponding one of the four walls of the reaction structure. In this manner, the fastener means clamps the inlet portion of the protection device between the retainer frame and the reaction structure. The first and second retainer strips have means for supporting the third and fourth retainer strips for limited movement along the length and across the width of the retainer frame under the influence of the fastener means when the fastener means is pressing the strips against the walls.

An apparatus constructed in accordance with the present invention helps to ensure that the inflatable device is retained securely within the reaction structure. The limited relative movement of the retainer strips across the frame enables them to be drawn tightly against the walls of the reaction structure by the fastener means. The inflatable device is thus clamped firmly between the retainer strips and the walls of the reaction structure.

BRIEF DESCRIPTION OF THE DRAWINGS

Further features of the present invention will become apparent to those skilled in the art to which the present invention relates from reading the following description with reference to the accompanying drawings, in which:

FIG. 6 is a view taken on line 6—6 of FIG. 5;

FIG. 7 is a view taken on line 7—7 of FIG. 5;

FIG. 8 is an exploded view of parts shown in FIGS. 6 and 7;

FIG. 9 is a view showing the parts of FIG. 8 in an interconnected relationship;

DESCRIPTION OF A PREFERRED EMBODIMENT

Figure 1:
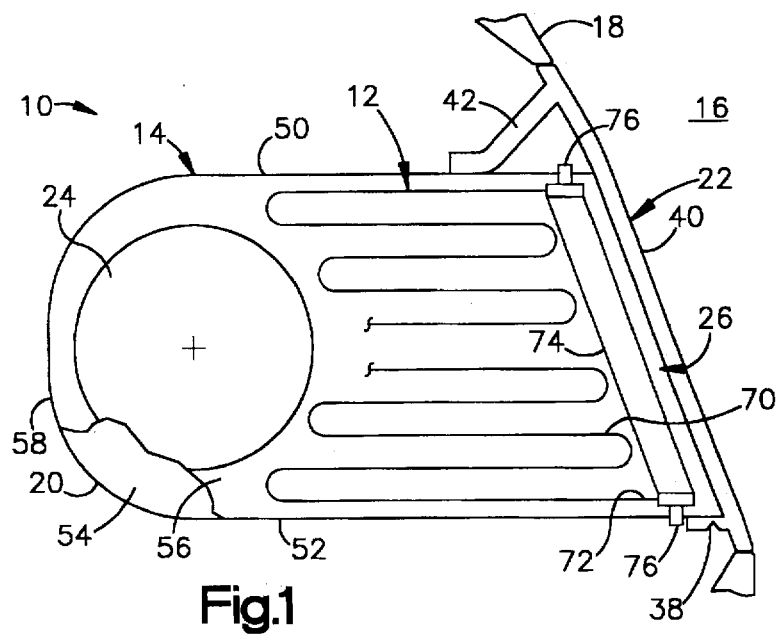
FIG. 1 is a schematic view of vehicle occupant protection apparatus comprising a preferred embodiment of the present invention.
Figure 2:
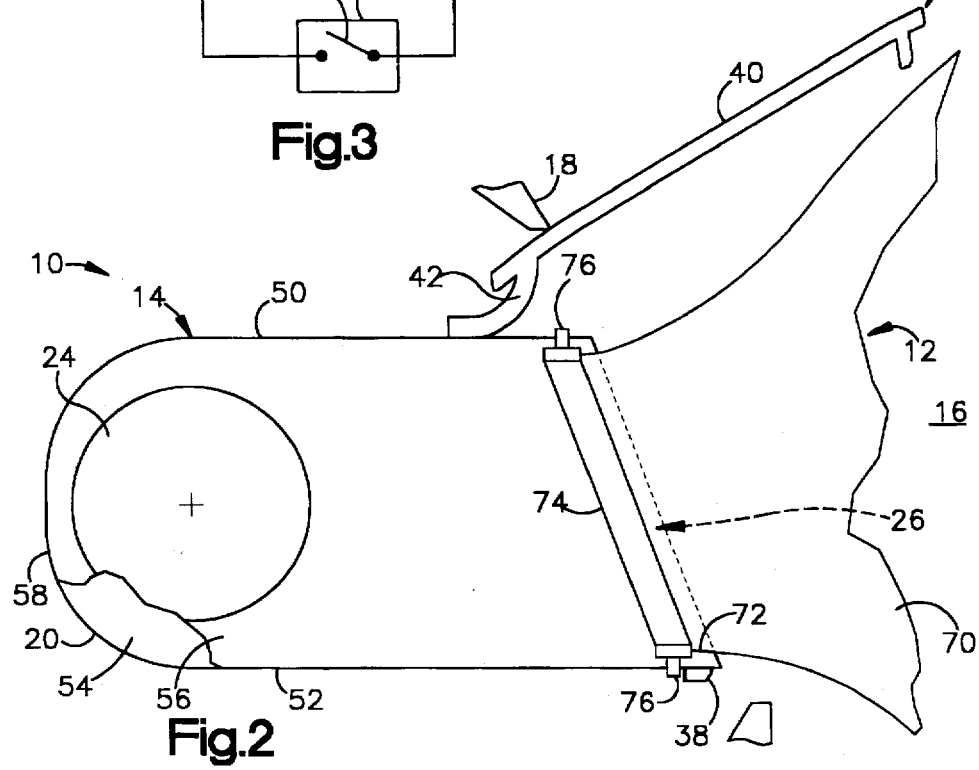
FIG. 2 is a view showing the apparatus of FIG. 1 in an actuated condition.

A vehicle occupant protection apparatus 10 comprising a preferred embodiment of the present invention is shown schematically in FIGS. 1 and 2. The apparatus 10 includes a particular type of inflatable vehicle occupant protection device 12 which is commonly referred to as an air bag. Other inflatable vehicle occupant protection devices that can be used in accordance with the present invention include inflatable seat belts, inflatable knee bolsters, inflatable head liners, and knee bolsters operated by inflatable air bags.

The air bag 12 is part of an air bag module 14 which is mounted in a vehicle at a location adjacent to the vehicle occupant compartment 16. As shown by way of example in FIGS. 1 and 2, the air bag module 14 is mounted in the instrument panel 18 at the passenger side of the vehicle. The air bag 12 is inflatable from a folded, uninflated condition, as shown fully in FIG. 1, to an unfolded, inflated condition, as shown partially in FIG. 2. When the air bag 12 is in the inflated condition, it extends from the instrument panel 18 into the vehicle occupant compartment 16 to help protect an occupant of the vehicle.

Other parts of the air bag module 14 include a reaction structure 20, a deployment door 22, and an inflator 24. The reaction structure 20 in the preferred embodiment of the present invention is a reaction canister containing the air bag 12 and the inflator 24. The deployment door 22 extends across a deployment opening 26 at the outer end of the reaction canister 20.

The inflator 24 is a cylindrical structure comprising a source of inflation fluid for inflating the air bag 12. As known in the art, the inflator 24 may contain an ignitable gas generating material for generating a large volume of inflation gas. The inflator 24 may alternatively contain a stored quantity of pressurized inflation fluid, or a combination of pressurized inflation fluid and ignitable material for heating the inflation fluid.

Figure 3:
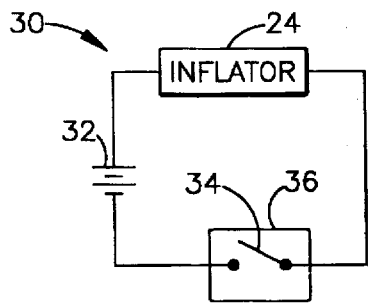
FIG. 3 is a schematic view of an electrical circuit including a part of the apparatus of FIG. 1.

As shown schematically in FIG. 3, the inflator 24 is included in an electrical circuit 30 with a power source 32 and a normally open switch 34. The power source 32 is preferably the vehicle battery and/or a capacitor. The switch 34 is part of a sensor 36 which senses a condition indicating the occurrence of a vehicle collision. The collision-indicating condition may comprise, for example, sudden vehicle deceleration caused by a collision. If the collision-indicating condition is at or above a predetermined threshold level, it indicates the occurrence of a collision having at least a predetermined threshold level of severity. The threshold level of collision severity is a level at which inflation of the air bag 12 is desired to help protect an occupant of the vehicle. The switch 34 then closes and electric current is directed through the inflator 24 to actuate the inflator 24.

When the inflator 24 is actuated, it emits the inflation fluid into the reaction canister 20. The reaction canister 20 directs the inflation fluid into the air bag 12 to inflate the air bag 12 from the uninflated condition of FIG. 1 to the inflated condition of FIG. 2. As the inflation fluid begins to inflate the air bag 12, it moves the air bag 12 outward through the deployment opening 26 and forcefully against the deployment door 22. A rupturable portion 38 of the deployment door 22 is ruptured by the force of the fluid pressure in the air bag 12. A panel portion 40 of the deployment door 22 is then released for pivotal movement away from the deployment opening 26. As the air bag 12 continues to move outward against the deployment door 22, it forcefully deflects a hinge portion 42 of the deployment door 22 so as to move the panel portion 40 pivotally away from the deployment opening 26. The deployment door 22 is thus opened and moved out of the path of the air bag 12 as the air bag 12 is inflated outward from the reaction canister 20 through the deployment opening 26 and into the vehicle occupant compartment 16. The structure of the deployment door 22, including the number and arrangement of rupturable portions, panel portions, and hinge portions, can vary from the example shown schematically in the drawings, as known in the art.

The reaction canister 20 has upper and lower walls 50 and 52 which are planar and parallel to each other. The reaction canister 20 further has first and second opposite side walls 54 and 56 which are planar and parallel to each other. The planar walls 50, 52, 54 and 56 extend inward from the deployment opening 26 to an inner wall 58 which closes the reaction canister 20 opposite the deployment opening 26. The inner wall 58 has a contour which is complementary to the cylindrical shape of the inflator 24.

Figure 4:
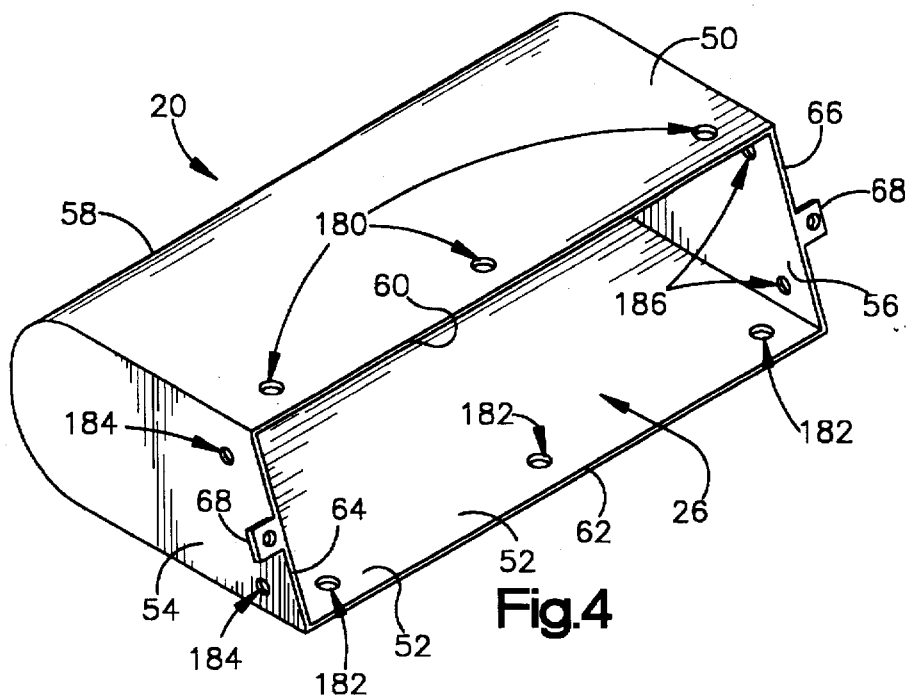
FIG. 4 is a perspective view of a part of the apparatus of FIG. 1.

As best shown in the perspective view of FIG. 4, the planar walls 50, 52, 54, and 56 of the reaction canister 20 together have a rectangular configuration, and the deployment opening 26 has a rectangular peripheral shape. Specifically, the upper and lower walls 50 and 52 have outer edge surfaces 60 and 62, respectively, which extend along the length of the deployment opening 26. The side walls 54 and 56 have respective outer edge surfaces 64 and 66 which extend across the width of the deployment opening 26. In this particular embodiment of the present invention, the outer edge surfaces 64 and 66 are inclined between the outer edge surfaces 60 and 62. The deployment opening 26 is thus inclined from a vertical plane in accordance with the deployment angle at which the air bag 12 is inflated outward from the particular instrument panel 18 in which the air bag module 14 is mounted.

A pair of mounting tabs 68 project from the side walls 54 and 56 of the reaction canister 20. The mounting tabs 68 support the reaction canister 20 on corresponding mounting parts (not shown) of the instrument panel 18 in a known manner. Although the reaction canister 20 in the preferred embodiment of the present invention is shown to have the mounting tabs 68, any other suitable mounting structure could be used as an alternative. Moreover, the reaction canister 20 in the preferred embodiment is a separate structure which is mounted in the instrument panel 18, but such a reaction structure could alternatively be defined by the structure of the instrument panel 18, or by the structure of another part of the vehicle from which the air bag 12 is to be inflated into the vehicle occupant compartment 16.

When the air bag 12 is being inflated from the condition of FIG. 1 to the condition of FIG. 2, a major portion 70 of the air bag 12 is moved outward from the reaction canister 20. An inlet portion 72 of the air bag 12 is retained in the reaction canister 20 by a retainer frame 74. The retainer frame 74 is a rectangular structure extending fully around the inside of the reaction canister 20 adjacent to the deployment opening 26. A plurality of fasteners 76 have engaged conditions in which they securely fasten the retainer frame 74 and the inlet portion 72 of the air bag 12 to the surrounding walls 50, 52, 54, and 56 of the reaction canister 20 at that location.

Figure 5:
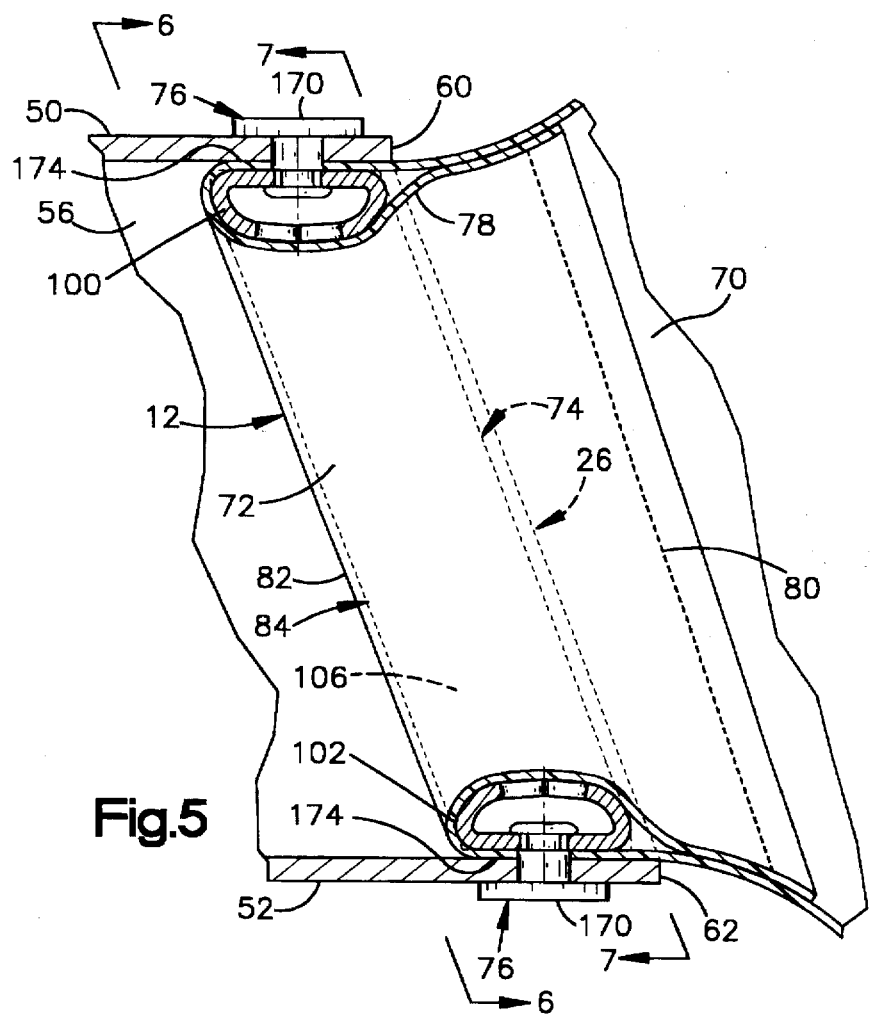
FIG. 5 is an enlarged sectional view of parts shown in FIG. 2.

As shown in greater detail in FIGS. 5–7, the inlet portion 72 of the air bag 12 is folded in a loop 78 which encloses the retainer frame 74. A seam structure 80 (shown schematically) closes the loop 78. In this arrangement, the retainer frame 74 supports the inlet portion 72 of the air bag 12 in a rectangular peripheral configuration such that a folded inner edge 82 of the air bag 12 defines a rectangular inlet opening 84 for receiving inflation fluid from the inflator 24. The air bag 12 may be formed of any suitable air bag material, but is preferably formed of a woven nylon fabric which is coated with silicone. Such an air bag material is known in the art. Accordingly, the seam structure 80 is preferably formed by laser welding and/or heat staking, but may alternatively comprise adhesives, stitching, or the like. Such seam structures also are known in the art.

As shown in FIGS. 8 and 9, the retainer frame 74 includes first, second, third, and fourth retainer strips 100, 102, 104, and 106. The four retainer strips 100–106 are separate parts having an interconnected relationship (FIG. 9) in which they define the four sides of the retainer frame 74.

The first retainer strip 100 is an elongated sleeve which, as shown in FIG. 9, is parallel to a longitudinal centerline 110 of the retainer frame 74. As shown in the end view of FIG. 10, the first retainer strip 100 comprises a shaped piece 112 of steel. The piece 112 of steel originally has a flat, rectangular configuration with a central section 114 and a pair of generally distinct side sections 116 and 118. The first retainer strip 100 is constructed by bending the piece 112 of steel into a somewhat flattened tubular configuration in which the side sections 116 and 118 abut each other along a longitudinally extending seam 120 at a location opposite the central section 114. In this configuration, the three sections 114, 116, and 118 of the piece 112 of steel together define a passage 122 extending throughout the length of the first retainer strip 100. A pair of edge surfaces 124 (FIGS. 8 and 9) at the opposite ends of the piece 112 of steel define a pair of opposed openings 126 into the passage 122.

The first retainer strip 100 further has a planar outer side surface 132 of the pie the central section 114 of the piece 112 of steel. As shown in FIG. 9, the outer side surface 132 faces outward from the retainer frame 74 in a direction parallel to a transverse centerline 134 of the retainer frame 74, i.e., in a direction perpendicular to the longitudinal centerline 110. A plurality of relatively small apertures 136 extend through the central section 114, and are spaced from each other in a longitudinally extending row. A corresponding plurality of larger apertures 138 are centered on the seam 120 at locations opposite the smaller apertures 136.

The structure of the second retainer strip 102 is substantially identical to the structure of the first retainer strip 100. This is indicated in the drawings by the use of the same reference numbers for corresponding parts of the first and second retainer strips 100 and 102. However, the second retainer strip 102 is oriented oppositely to the first retainer strip 100 so that its planar outer side surface 132 faces oppositely outward from the retainer frame 74.

As shown in FIGS. 8 and 9, the third retainer strip 104 is a U-shaped part with a vertically extending base 140 and a pair of horizontally extending projections 142 at opposite ends of the base 140. As shown in the top view of FIG. 12, the projections 142 are spaced horizontally from each other, and the base 140 is inclined between the projections 142. This configuration of the third retainer strip 104 corresponds with the inclination of the deployment opening 26 (FIGS. 4 and 5) and the configuration of the reaction canister 20 adjacent to the deployment opening 26.

The base 140 of the third retainer strip 104 has planar inner and outer side surfaces 143 and 144 facing oppositely away from each other in directions parallel to the longitudinal centerline 110 of the retainer frame 74. A pair of apertures 146 extend through the base 140. A pair of internally threaded nuts 148 are aligned with the apertures 146, and are fixed to the inner side surface 143 of the base 140 by welds 150.

Each projection 142 on the third retainer strip 104 has a wide portion 152 (FIG. 12) projecting from the base 140, and further has a narrow portion 154 projecting from the wide portion 152. Each narrow portion 154 has a longitudinally extending slot 156 with an open end 158. Each wide portion 152 has a planar outer surface 160 and a pair of short edge surfaces 162. The planar outer surfaces 160 face outward from the retainer frame 74 in directions parallel to the transverse centerline 134. The edge surfaces 162 face inward along the retainer frame 74 in directions parallel to the longitudinal centerline 110.

Like the first and second retainer strips 100 and 102, the third and fourth retainer strips 104 and 106 have corresponding parts with substantially identical structures. This is indicated in the drawings by the use of the same reference numbers for those parts. The third and fourth retainer strips 104 and 106 also are oriented oppositely relative to each other. The outer side surfaces 144 of the two base portions 140 thus face oppositely outward from the retainer frame 74. The two pairs of projections 142 project oppositely inward toward each other along the length of the retainer frame 74.

When the air bag module 14 (FIG. 1) is being assembled, the retainer frame 74 is received and enclosed within the loop 78 (FIG. 5) in the inlet portion 72 of the air bag 12 in the loosely assembled condition in which it is shown separately in FIG. 9. The projections 142 on the third and fourth retainer strips 104 and 106 then extend into the passages 122 through the openings 126 at the opposite ends of the first and second retainer strips 100 and 102. When the four retainer strips 100-106 are in this loosely interconnected relationship, the first and second strips 100 and 102 support the third and fourth strips 104 and 106 for limited movement in directions extending longitudinally and transversely across the four sides of the retainer frame 74.

Figure 10:
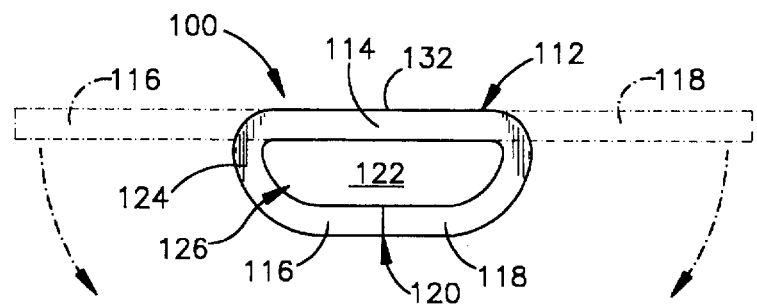
FIG. 10 is a view taken on line 10—10 of FIG. 8.
Figure 11:
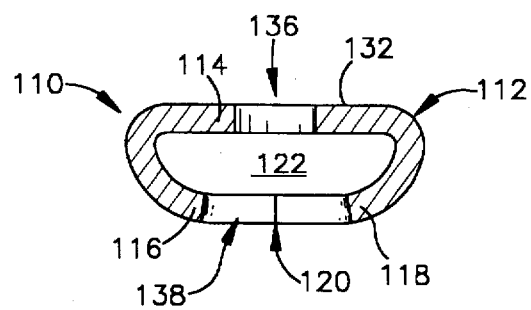
FIG. 11 is a view taken on line 11—11 of FIG. 8.
Figure 12:
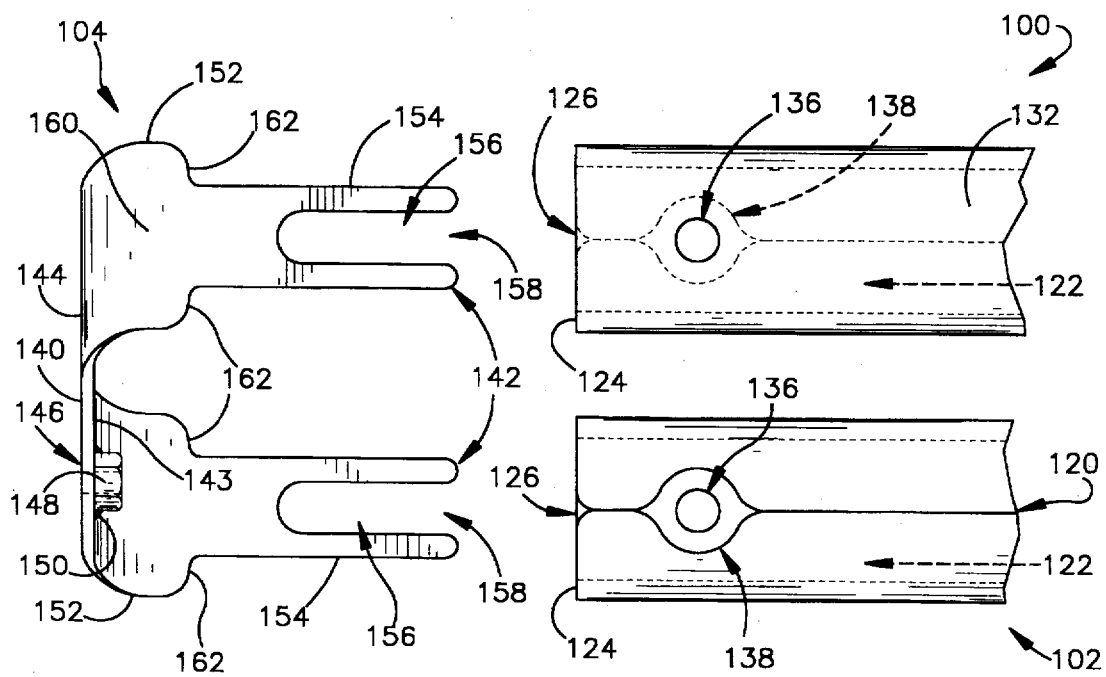
FIG. 12 is a view taken on line 12—12 of FIG. 8.

More specifically, the first and second retainer strips 100 and 102 support the projections 142 on the third and fourth retainer strips 104 and 106 for limited movement in the passages 122. Sliding movement of the projections 142 longitudinally inward of the passages 122, e.g., in a direction extending from left to right in FIG. 12, is limited by the wide portions 152 of the projections 142 upon abutment of their edge surfaces 162 with the edge surfaces 124 at the openings 126. Shifting movement of the projections 142 transversely across the openings 126, i.e., in directions extending horizontally and vertically in FIG. 10, is limited by the peripheral size and shape of the edge surfaces 124 at the openings 126. Sliding movement of the projections 142 longitudinally outward of the passages 122 is limited by the surrounding inlet portion 72 (FIGS. 5 and 6) of the air bag 12.

As shown in FIG. 7, the fasteners 76 include rivets 170 and bolts 172. The first and second retainer strips 100 and 102 are fastened to the upper and lower walls 50 and 52, respectively, of the reaction canister 20 by the rivets 170. The second and third retainer strips 104 and 106 are fastened to the opposite side walls 54 and 56, respectively, by the bolts 172. Alternatively, any of the fasteners 76 could be another type of fastener, such as a plastic "Christmas tree" fastener or a spring clip.

When the rivets 170 are being engaged, they draw the first and second retainer strips 100 and 102 in opposite directions outward across the width of the retainer frame 74 toward the upper and lower walls 50 and 52. The planar outer side surfaces 132 of the first and second strips 100 and 102, as well as adjoining portions 174 of the loop 78 in the air bag 12, are then pressed firmly against the upper and lower walls 50 and 52. When the bolts 172 are being engaged, they draw the second and third retainer strips 104 and 106 in opposite directions outward along the length of the retainer frame 74 toward the side walls 54 and 56. The planar outer side surfaces 144 of the second and third strips 104 and 106, and adjoining portions 176 of the loop 78, are then pressed firmly against the side walls 54 and 56. The limited ranges of movement of the strips 100-106 across the width and along the length of the retainer frame 74, as described above, enables such movement of the strips 100-106 relative to each other under the influence of the fasteners 76.

Referring again to FIG. 4, the upper and lower walls 50 and 52 of the reaction canister 20 have respective apertures 180 and 182 for receiving the rivets 170. The opposite side walls 54 and 56 likewise have respective apertures 184 and 186 for receiving the bolts 172. The upper and lower walls 50 and 52 have nominal positions in which the apertures 180 and 182 are aligned and spaced a predetermined distance from each other across the width of the deployment opening 26. The apertures 180 and 182 are thus arranged for the first and second retainer strips 100 and 102 to be fastened to upper and lower walls 50 and 52 in nominal positions that are parallel and coextensive with each other along the length of the deployment opening 26.

In a similar manner, the opposite side walls 54 and 56 have nominal positions in which the apertures 184 and 186 are aligned and spaced from each other a predetermined distance across the length of the deployment opening 26. The apertures 184 and 186 are thus arranged for the third and fourth retainer strips 104 and 106 to be fastened to the side walls 54 and 56 in nominal positions that are parallel and coextensive with each other across the length of the deployment opening 26, with the projections 142 extending equal distances inward of the passages 122.

Manufacturing tolerances may result in a slight displacement of any one or more of the walls 50–56 of the reaction canister 20 from its nominal position. The corresponding rivets 170 or bolts 172 will then move the corresponding retainer strip 100, 102, 104, or 106 to a fastened position which is shifted slightly from its nominal position. The limited ranges of movement of the strips 100–106 relative to each other enable this type of movement, as needed. This helps to ensure that the adjoining portions 174 and 176 of the air bag 12 are pressed firmly against the surrounding walls 50–56 of the reaction canister 20.

A particular feature of the present invention relates to the narrow portions 154 of the projections 142 on the third and fourth retainer strips 104 and 106. In accordance with this feature of the present invention, each slot 156 (FIG. 12) can receive a rivet 170 through its open end 158. This enables the projections 142 to slide longitudinally past the rivets 170, if any, that extend across the passages 122 adjacent to the openings 126.

Another particular feature of the present invention relates to the wide portions 152 of the projections 142. When the third and fourth strips 104 and 106 are fastened to the side walls 54 and 56 in their nominal positions, as shown in FIG. 7, the planar outer surfaces 160 on the wide portions 152 are coplanar with the planar outer side surfaces 132 on the first and second strips 100 and 102. This helps to ensure that the adjoining portions 174 of the air bag 12 are pressed firmly against the upper and lower walls 50 and 52 adjacent to the opposite ends of the first and second strips 100 and 102.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

an inflatable vehicle occupant protection device having an inlet portion;

a reaction structure having four walls in a rectangular configuration surrounding said inlet portion of said protection device;

a rectangular retainer frame enclosed within said inlet portion of said protection device, said frame having a length and a width defined by first, second, third, and fourth retainer strips, said strips being parts that are separate from each other; and fastener means for pressing each of said strips against a corresponding one of said four walls so as to clamp said inlet portion of said protection device between said frame and said reaction structure;

said first and second strips having means for supporting said third and fourth strips for limited movement along said length and across said width of said frame under the influence of said fastener means when said fastener means is pressing said strips against said walls.

2. Apparatus as defined in claim 1 wherein said first and second strips are shaped as elongated sleeves and terminate at opposite ends of said sleeves, said third and fourth strips being U-shaped structures with projections extending longitudinally inward of said sleeves at said opposite ends of said sleeves, said limited movement of said third and fourth strips including sliding movement of said projections longitudinally in said sleeves.

3. Apparatus as defined in claim 2 wherein said limited movement of said third and fourth strips includes shifting movement of said projections within said sleeves in directions extending transversely across said sleeves.

4. Apparatus as defined in claim 3 wherein said shifting movement of said projections within said sleeves includes movement to nominal positions in which planar outer surfaces of said projections are coplanar with adjacent planar outer surfaces of said sleeves.

5. Apparatus as defined in claim 2 wherein said fastener means comprises fasteners extending through apertures in said sleeves, said projections having slots in which said fasteners are movable relative to said projections upon said movement of said projections longitudinally in said sleeves.

6. Apparatus as defined in claim 5 wherein said slots have open ends through which said fasteners are receivable upon movement of said projections inward of said sleeves.

7. Apparatus as defined in claim 1 wherein said reaction structure is a reaction canister containing a source of inflation fluid for inflating said protection device.

8. Apparatus comprising:

retainer means for retaining an inflatable vehicle occupant protection device in a rectangular reaction structure, said retainer means comprising separate retainer strips which together define a rectangular frame; and fastener means for pressing said strips against surrounding walls of the reaction structure;

at least one of said strips comprising a sleeve in which a projection on another one of said strips is movable under the influence of said fastener means when said fastener means is pressing said strips against said walls, said movement of said projection in said sleeve including movement to a nominal position in which a planar outer surface of said projection is coplanar with an adjacent planar outer surface of said sleeve.

9. Apparatus as defined in claim 8 wherein said one of said strips terminates at opposite ends of said sleeve.

10. Apparatus as defined in claim 8 wherein said fastener means comprises fasteners with installed positions extending through apertures in said sleeve, said projection having a slot in which at least one of said fasteners is movable relative to said projection upon said movement of said projection in said sleeve.

11. Apparatus as defined in claim 10 wherein said slot has an open end through which said one of said fasteners is receivable upon said movement of said projection in said sleeve.

12. Apparatus as defined in claim 8 wherein the reaction structure is a reaction canister.

* * * * *